US012459613B2

(12) United States Patent
Kardas et al.

(10) Patent No.: US 12,459,613 B2
(45) Date of Patent: Nov. 4, 2025

(54) RETRACTABLE HULL MOUNTING DATA COLLECTING SYSTEM

(71) Applicant: Bass Pro, LLC, Springfield, MO (US)

(72) Inventors: Jason Christopher Kardas, Oceanside, CA (US); Drew William Brackett, Carlsbad, CA (US); William John Broadway, Oceanside, CA (US); James Taylor Czarnowski, Fallbrook, CA (US); Phillip James Dow, Oceanside, CA (US); Elizabeth Catherine Sexton, San Clemente, CA (US); Shane Yellin, Carlsbad, CA (US)

(73) Assignee: Bass Pro, LLC, Springfield, MO (US)

( * ) Notice: Subject to any disclaimer, the term of this patent is extended or adjusted under 35 U.S.C. 154(b) by 0 days.

(21) Appl. No.: 18/521,407

(22) Filed: Nov. 28, 2023

(65) Prior Publication Data

US 2024/0182143 A1 Jun. 6, 2024

Related U.S. Application Data

(63) Continuation of application No. 17/354,000, filed on Jun. 22, 2021, now Pat. No. 11,866,132, which is a continuation of application No. 16/002,733, filed on Jun. 7, 2018, now Pat. No. 11,091,235.

(51) Int. Cl.

| | |
|---|---|
| ***B63B 49/00*** | (2006.01) |
| ***B63B 59/00*** | (2006.01) |
| ***G10K 11/00*** | (2006.01) |
| *B63B 17/00* | (2006.01) |

(52) U.S. Cl.

CPC .............. *B63B 49/00* (2013.01); *B63B 59/00* (2013.01); *B63B 17/0081* (2013.01); *B63B 2201/18* (2013.01); *G10K 11/006* (2013.01)

(58) Field of Classification Search

CPC ..... B63B 49/00; B63B 59/00; B63B 17/0081; B63B 2201/18; G10K 11/006; B63C 11/49

See application file for complete search history.

(56) References Cited

U.S. PATENT DOCUMENTS

| | | | |
|---|---|---|---|
| 204,770 | A | 6/1878 | Smith |
| 3,426,725 | A | 2/1969 | Gerhardsen |
| 3,484,066 | A | 12/1969 | Aunspaugh |
| 3,903,634 | A | 9/1975 | Miyame |
| 4,282,590 | A | 8/1981 | Wingate |

(Continued)

FOREIGN PATENT DOCUMENTS

| | | |
|---|---|---|
| CN | 201545161 | 8/2010 |
| CN | 202690608 | 1/2013 |

(Continued)

OTHER PUBLICATIONS

Hobie Cat Co., "H-Rail Overview", Jun. 18, 2014, retrieved on Jun. 15, 2017, retrieved from URL <"https://www.youtube.com/watch?v=roelE7NMNrk">, 21 seconds in to video.

*Primary Examiner* — Andrew Polay

(74) *Attorney, Agent, or Firm* — Dinsmore & Shohl LLP

(57) ABSTRACT

A watercraft mounting system that embodies a moving mounting platform and a protective hull cavity which provides protection, prevents damage and improves storage of data collection systems.

23 Claims, 9 Drawing Sheets

(56) References Cited

U.S. PATENT DOCUMENTS

| | | | |
|---|---|---|---|
| 4,852,291 | A | 8/1989 | Mengo |
| 4,852,491 | A | 8/1989 | Holl et al. |
| 5,007,612 | A | 4/1991 | Manfre |
| 5,353,263 | A | 10/1994 | Pakker et al. |
| 5,413,063 | A | 5/1995 | King |
| 5,526,765 | A | 6/1996 | Ahearn |
| 7,040,587 | B2 | 5/2006 | Thompson et al. |
| 7,117,771 | B2 | 10/2006 | Whiteford |
| 7,236,427 | B1 | 6/2007 | Schroeder |
| 7,395,775 | B2 | 7/2008 | LaScala |
| 7,433,268 | B1 | 10/2008 | Schroeder |
| 7,434,775 | B2 | 10/2008 | Wilcox |
| 7,437,775 | B2 | 10/2008 | Reynolds |
| 7,500,451 | B2 | 3/2009 | Ingraham et al. |
| 7,841,124 | B2 | 11/2010 | Wegman |
| 8,056,495 | B2 | 11/2011 | Lemons |
| 8,453,373 | B2 | 6/2013 | Gordon |
| 9,604,703 | B2 | 3/2017 | Kardas et al. |
| 2005/0102881 | A1 | 5/2005 | Legendziewicz |
| 2010/0271907 | A1* | 10/2010 | Lindner .................. B63G 8/39 367/151 |
| 2015/0144044 | A1 | 5/2015 | Item |
| 2017/0293022 | A1* | 10/2017 | Andreis .................. B63B 49/00 |
| 2018/0120431 | A1 | 5/2018 | Pelin et al. |
| 2022/0009603 | A1 | 1/2022 | Kardas et al. |

FOREIGN PATENT DOCUMENTS

| | | |
|---|---|---|
| CN | 103090115 | 5/2013 |
| CN | 103144060 | 6/2013 |
| EP | 0997375 | 5/2000 |
| GB | 2127887 | 4/1984 |

* cited by examiner

RETRACTABLE HULL MOUNTING DATA COLLECTING SYSTEM

CROSS-REFERENCE TO RELATED APPLICATIONS

This application is a continuation application of and claims priority to U.S. application Ser. No. 17/354,000, filed on Jun. 22, 2021, which is a continuation application of and claims priority to U.S. application Ser. No. 16/002,733, filed on Jun. 7,2018.

FIELD OF INVENTION

This invention relates to a data collection system on a watercraft.

BACKGROUND OF INVENTION

Underwater data collection is a very popular feature among fishing and recreational watercraft. The most common application of data collection is with digital devices like cameras and transducers. Transducers have been mounted to the bottom or transom of watercraft and ping a sonar signal down and read back the reflecting signal. U.S. Pat. No. 7,437,775 discloses a rail mounted system which may include a depth meter. Other rail mounted systems are disclosed in U.S. Pat. Nos. 4,852,491 and 7,841,124. In underwater data detection and collection using digital devices, the bounced back signal is recorded and translated to a screen display to give the screen displayed readings about things like water temperature, depth, underwater life and ground profiles. This invention provides a novel mounting system for these data collection devices on watercraft which is not subject to disruption or damage due to impact with submerged objects, or other external forces.

SUMMARY OF THE INVENTION

A protective cavity in the bottom of a watercraft hull, a moveable mounting platform adapted to carry data detection and collection devices releasably suspended from said cavity, said moveable mounting platform being coupled to spring supports which allows said moveable mounting platform when deployed to move on said spring supports in any direction with respect to the hull in response to external impact or force.

A watercraft having a protective cavity in the bottom of the hull, a moveable mounting platform adapted to carry data detection and collection devices releasably suspended within said cavity, said moveable mounting platform being coupled to spring supports which allows said moveable mounting platform when deployed to move on said spring supports in any direction with respect to the hull in response to external impact or force.

A protective cavity in the bottom of a watercraft hull, a static rim affixed to a lower extremity of said cavity, a moveable mounting platform adapted to carry data collection devices releasably suspended within said cavity above said rim and sized to be able to pass through said rim, spring supports adapted to cause said moveable mounting platform to move down to and project below said cavity when the said movable mounting platform is not suspended to thereby deploy said data collection devices while allowing said moveable mounting platform passively to move on said spring supports in any direction with respect to the hull in response to external impact or force.

A watercraft having a protective cavity in the bottom of the hull, a static rim affixed to a lower extremity of said cavity, a moveable mounting platform adapted to carry data collection devices releasably suspended within said cavity above said rim and sized to be able to pass through said rim, spring supports adapted to cause said moveable mounting platform to move down to and project below said cavity when the said movable mounting platform is not suspended to thereby deploy said data collection devices while allowing said moveable mounting platform passively to move on said spring supports in any direction with respect to the hull in response to external impact or force.

The foundation of the invention is a moveable mounting platform. The design of this system is a platform that acts as a universal mounting platform.

This moveable mounting surface or platform is attached to a static object, preferably a rim, via a spring-like system. In the case of the preferred embodiment of this invention, there is a surrounding static rim which is affixed to the hull that extends closely around the moveable mounting platform. This platform is pulled down from the rim in four places by a bungee cord system which provides full articulation.

The moveable nature of the mounting platform allows it to be suspended within the cavity and to be moved up actively with a retraction line. Upon release of the retraction line, the four-point spring loaded system, preferably bungee cord, allows the moveable mounting platform to move passively and articulate to any irregular forces or objects impacting the system. Mountable objects can include but are not restricted to:

a. Recessed down-scan transducers.

b. Side-scan transducers.

c. Cameras.

THE DRAWINGS

Turning to the drawings.

DESCRIPTION OF THE PREFERRED EMBODIMENTS

Figure 1:
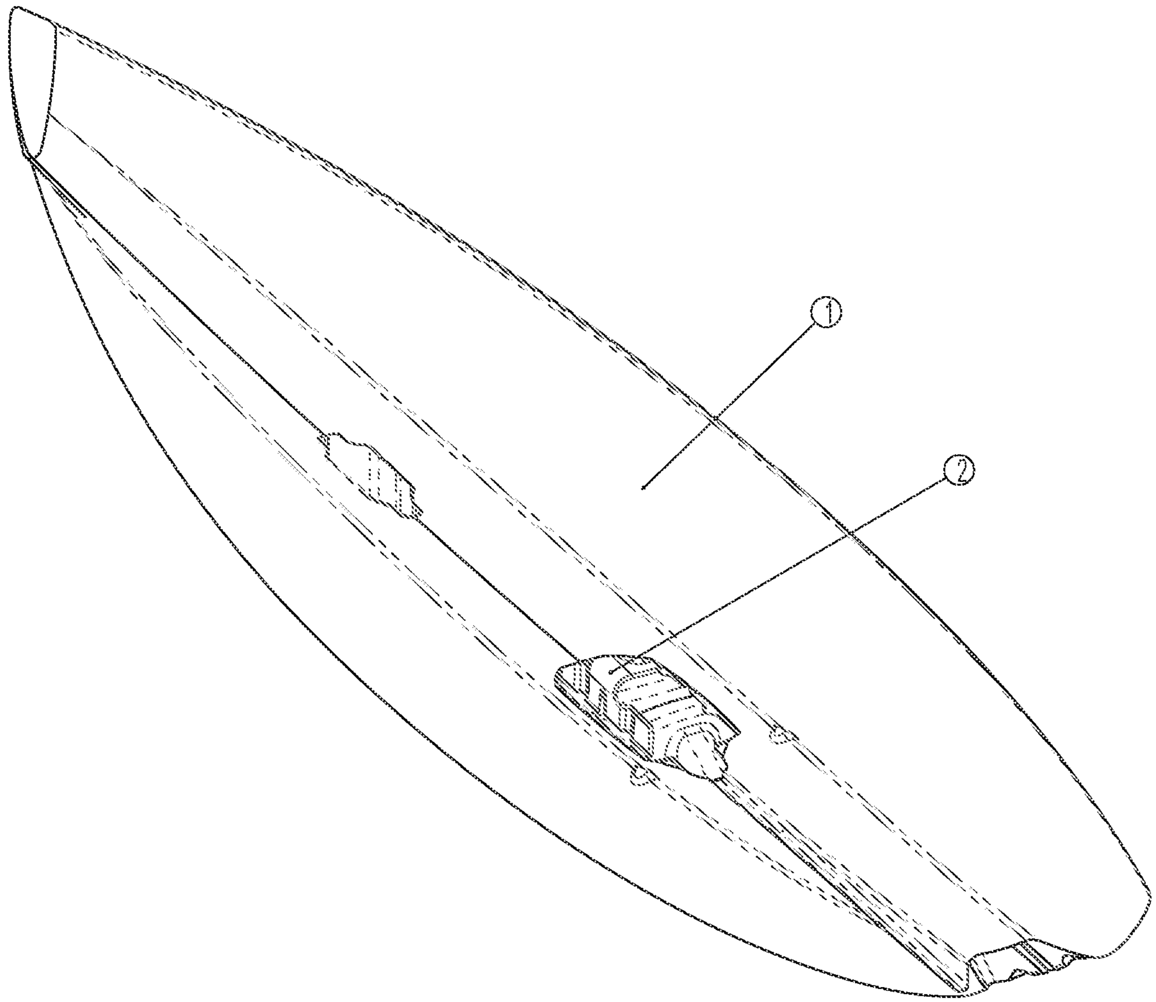
FIG. 1 is a perpendicular view of the hull shape of a watercraft and the recess cavity in the protective hull.

Turning to the drawings in more detail:

FIG. 1 illustrates the portion of the hull 1 having recess cavity 2 therein. The cavity allows for a protection area above the bottom of the hull.

Figure 2:
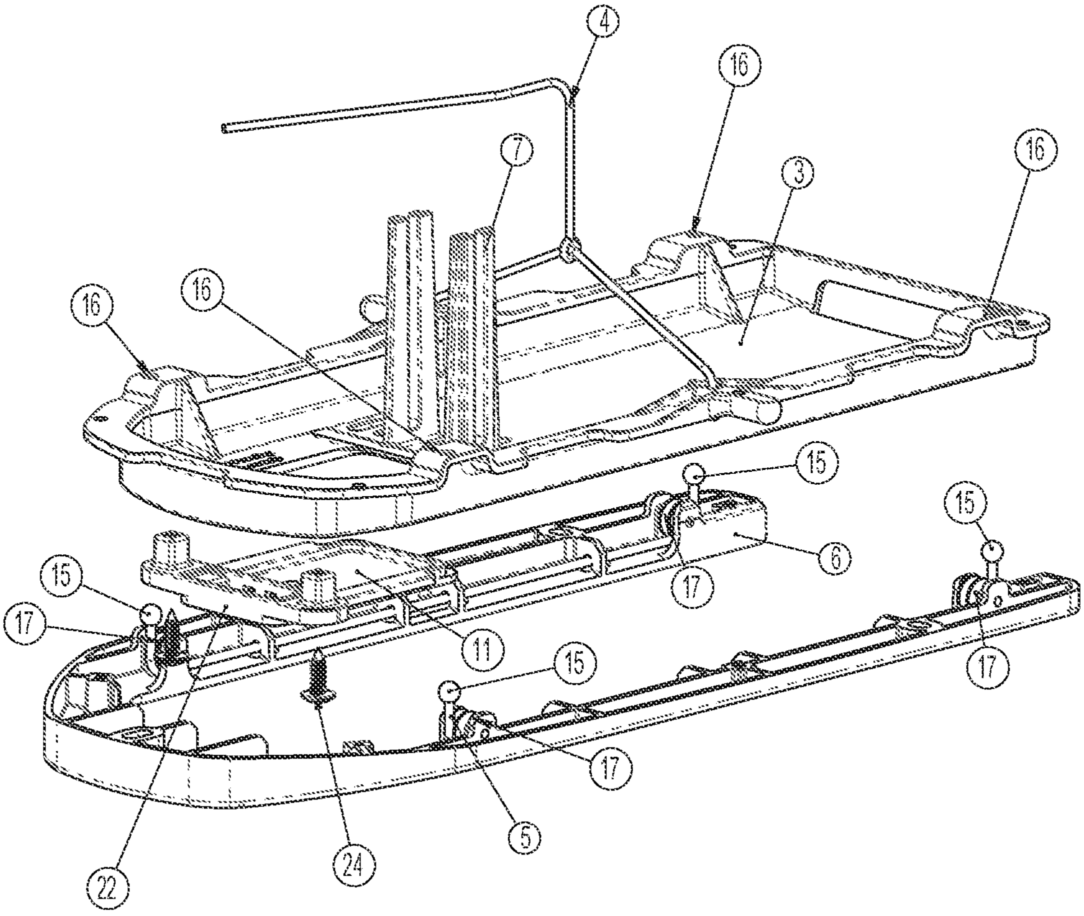
FIG. 2 is an exploded view of the assembly of the movable mounting platform and the fixed rim.
Figure 9:
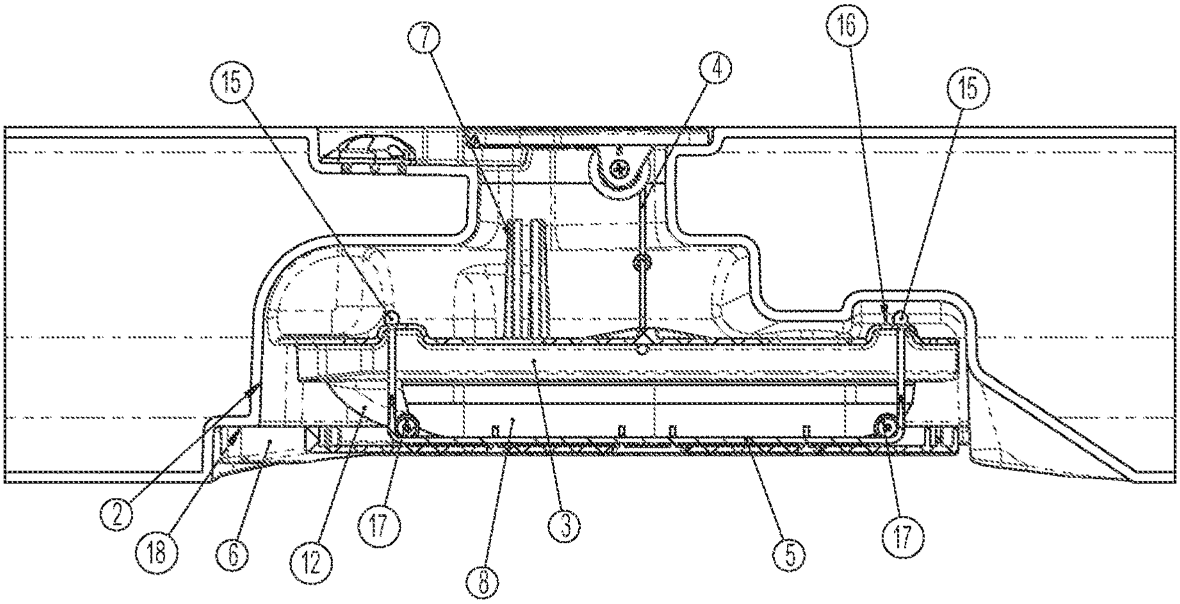
FIG. 9 is a side view of the hull in partial cutaway showing the moveable mounting platform retracted in the cavity and the pulleys and bungee cord.

FIG. 2 illustrates the assembly of the moveable plate 3 and outer rim 6. The assembly comprises a static outer rim 6 which is constrained by offset 18 in cavity 2. The outer static rim 6 contains a bungee cord 5 at each side. The spring force of each bungee cord 5 is attached at knots 15 at the four corners 16 of the mounting plate 3 as shown in FIG. 9. Each bungee cord 5 on rim 6 runs over pulleys 17 which allow for all angle articulation of the moveable mounting platform 3 when the moveable mounting platform is deployed upon release of the retraction cord 4.

Figure 4:
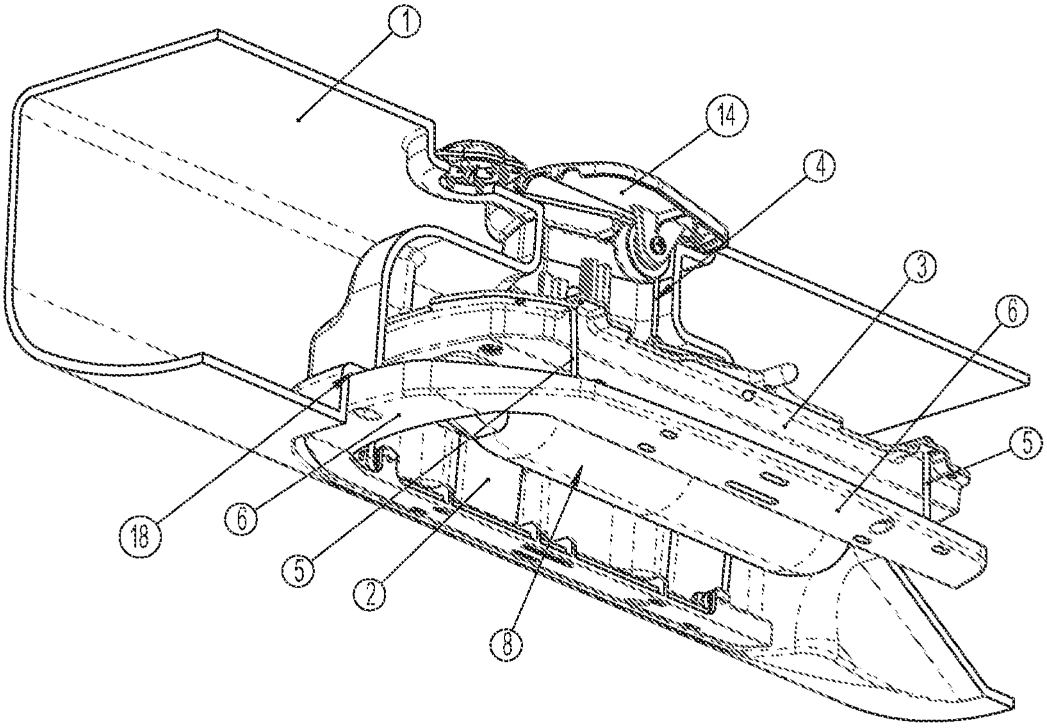
FIG. 4 is similar to FIG. 3, showing a segment of the hull and the moveable mounting platform with the side-scan transducer, the moveable mounting platform being in the raised or retracted position.
Figure 5:
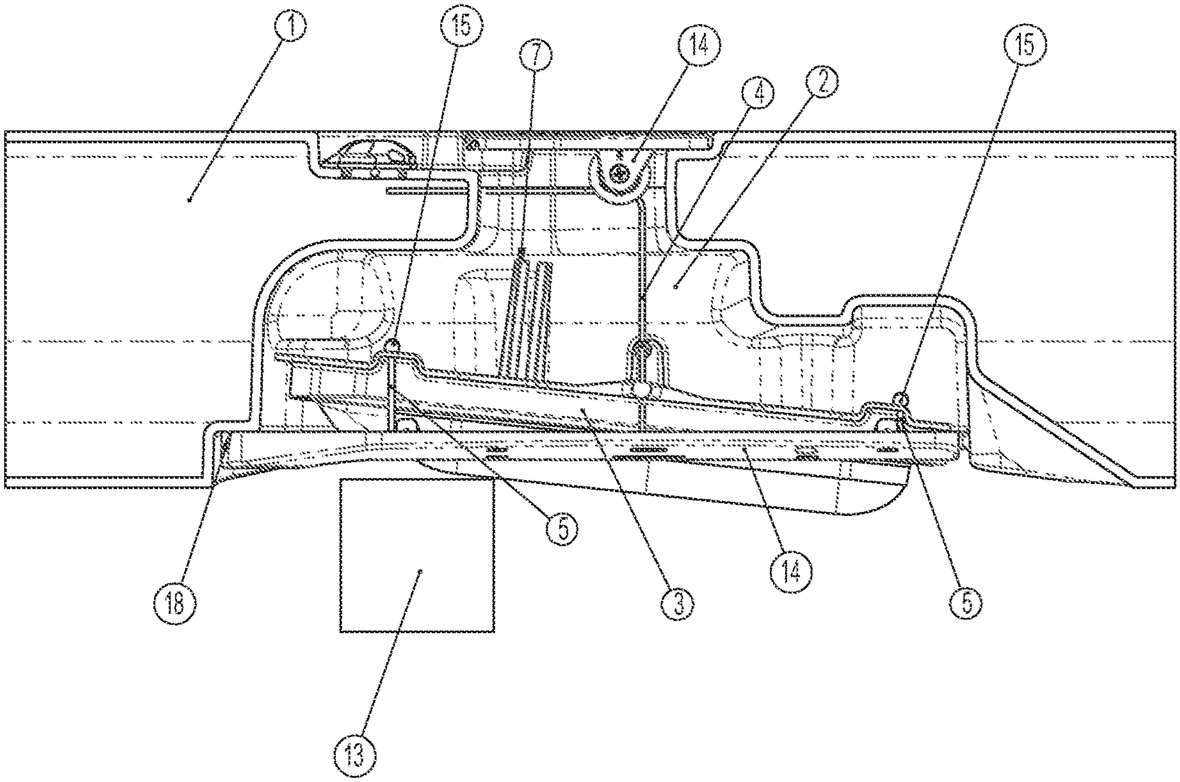
FIG. 5 shows the passive movement of the deployed moveable mounting platform with transducer, upon collision with a foreign object following release of the retraction line.

Each bungee cord 5 is stressed, that is, under tension so as to exert downward force on the moveable mounting plate 3, moving it down from the surrounding rim 6 during deployment. For retraction, the cord 4 is used to pull the moveable mounting platform 3 up in the cavity 3 and above rim 6 as shown in FIG. 4. The rim 6 is held in place against upward movement by the projection 18 in hull cavity 2. When it is desired to deploy the device carried on the moveable mounting platform 3, the retraction cord 4 is released or slackened. Each bungee cord 5 then pulls the moveable mounting platform down as shown in FIG. 5. The moveable mounting platform 3 is then free to articulate and angle in any direction while under the spring-like tension of the bungee cord 5.

Figure 3:
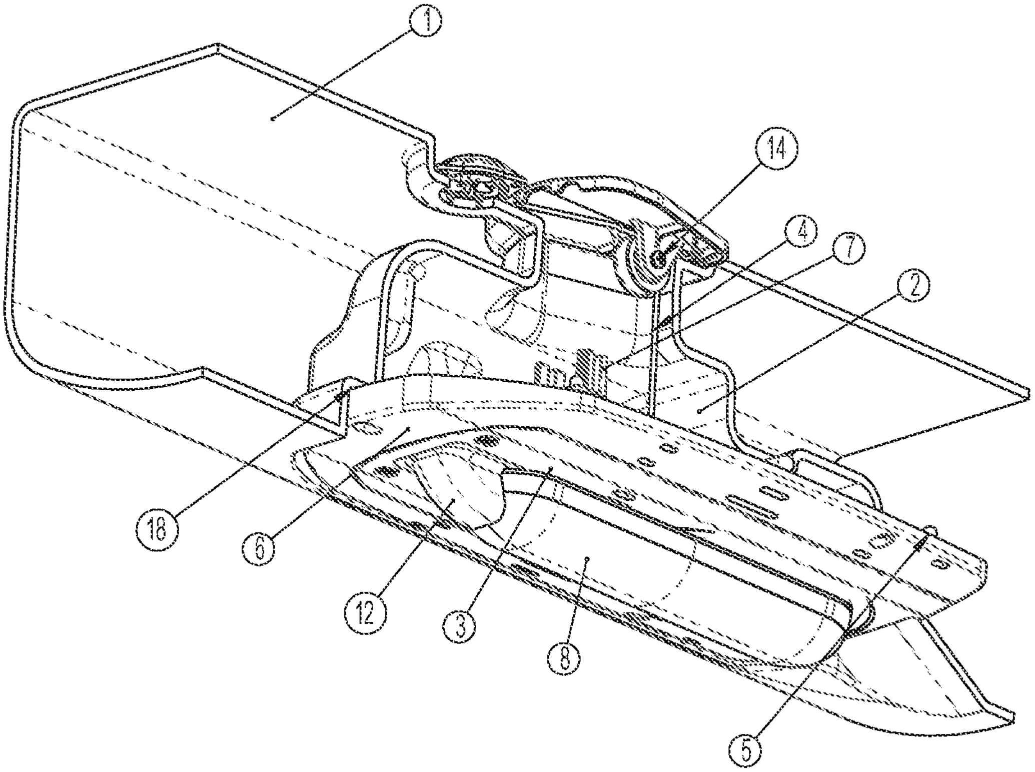
FIG. 3 is a view, with parts of the hull removed, taken from below and to the side of the hull showing a side-scan transducer mounted to the bottom of the moveable mounting platform with the platform being in the lowered or deployed position projecting from the protective cavity in the hull.

FIGS. 3 and 5 display a side-scan transducer 8 mounted to the bottom of the plate 3 when in the deployed position. The mounting plate 3 is sized so that it can pass through static outer rim 6 when upward tension on retraction cord 4 is released. When deployed the transducer 8 sticks proud of the bottom and is vulnerable to damage. In front of the transducer 8 there is a kick-up guard 12 to protect the transducer from impact with external objects.

FIG. 4 displays the mounting plate 3 and transducer 8 in the retracted position. The mounting plate 3 is actively retracted by upward tension on retraction line 4. The transducer is actively retracted by pulling on the retraction cord 4 which is directed around a pulley 14 and leads to a pull handle somewhere on the watercraft. The pull handle is operated manually. However, power operation of the retraction cord 4 is an obvious alternative. Note that in this position the side-scan transducer 8 is safely recessed in the cavity 2.

FIG. 5 illustrates the passive retraction feature. In the event of a collision with a foreign object 13, the mounting plate 3 will articulate over the obstruction into the cavity 2 without the need for use of the retraction cord 4.

Figure 6:
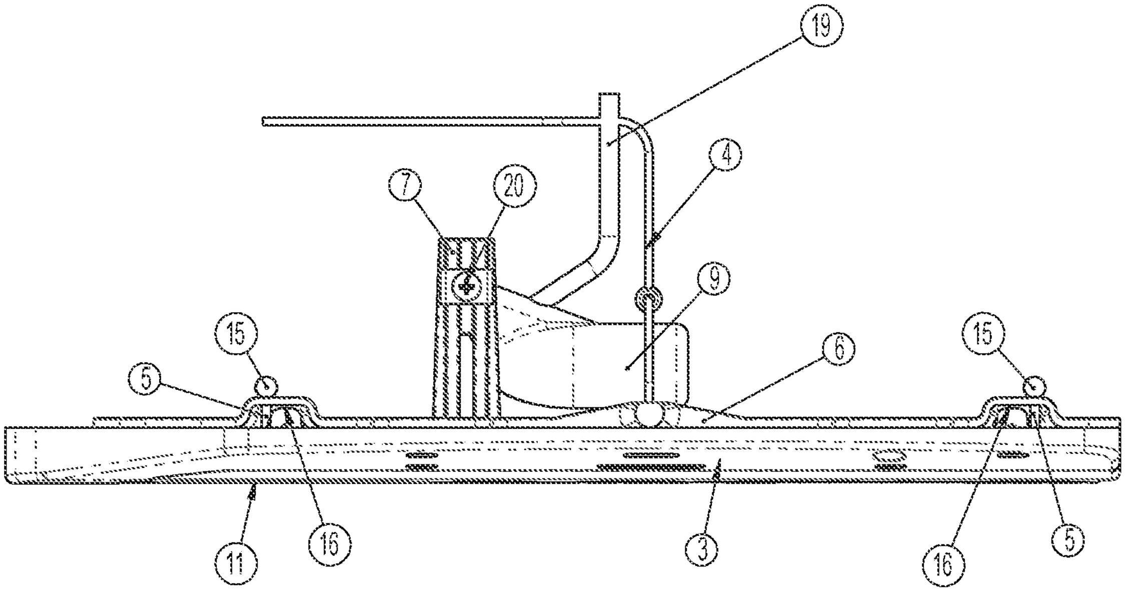
FIG. 6 shows the deployed moveable mounting platform carrying a down-scan transducer.
Figure 7:
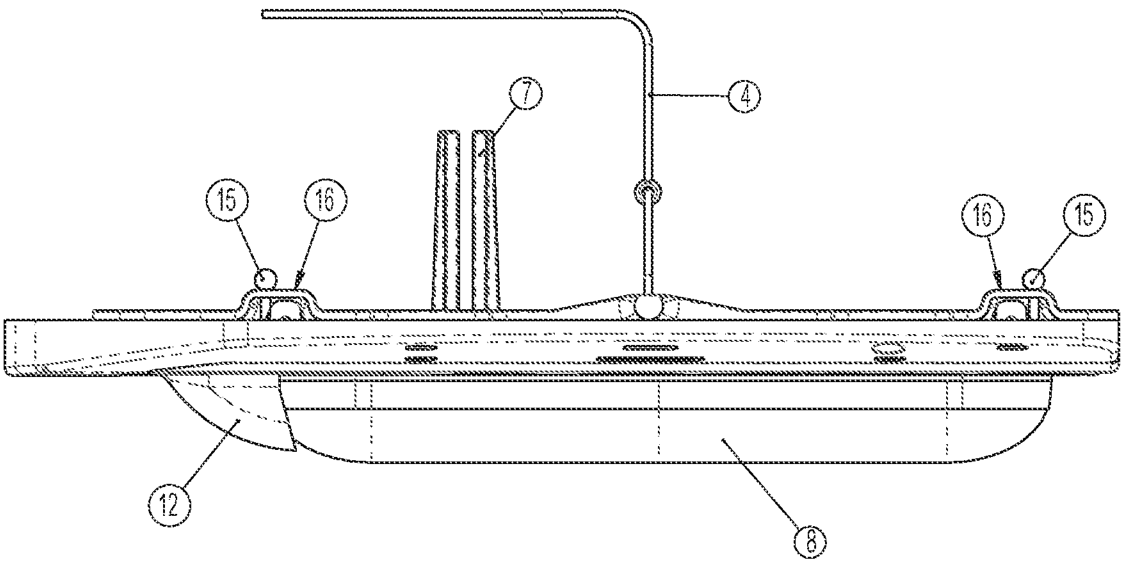
FIG. 7 shows the deployed moveable mounting platform carrying a side-scan transducer.
Figure 8:
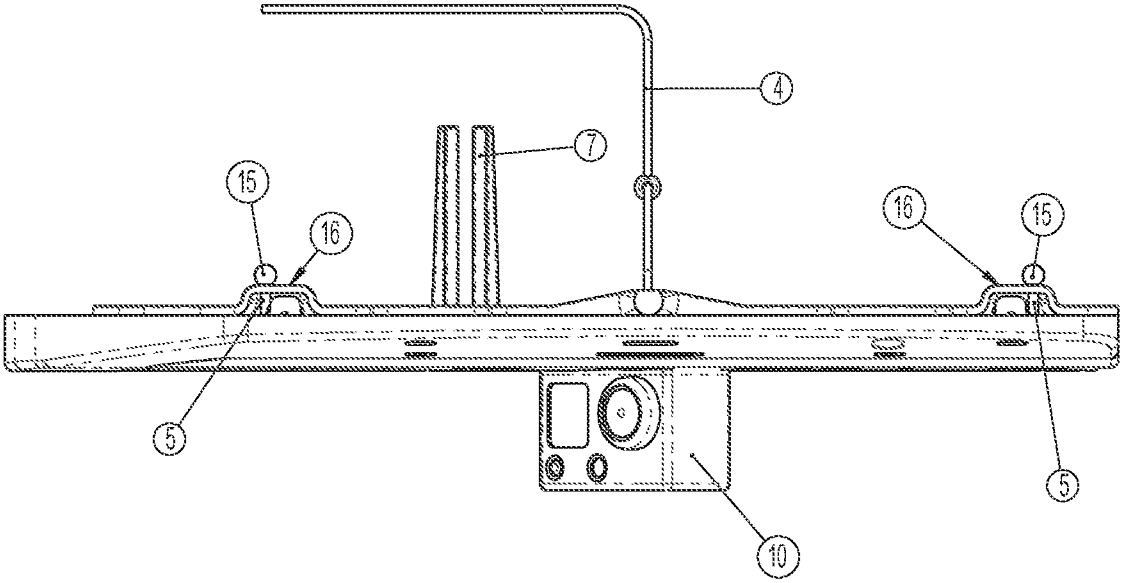
FIG. 8 shows the deployed mounting plate carrying a camera.

FIGS. 6 through 8 illustrate a variety of possible objects that could be mounted to the plate which include a down-scan transducer 9, side-scan transducer 8 and camera 10. In FIG. 6, the electric power for the transducer is provided via electrical connection 19.

The bungee cord 5 is used in the preferred embodiment to provide durability and corrosion resistance, but other spring systems (coil springs, rubber rod, leaf springs) creating down pressure on the mounting plate 3 can be used in this system.

As shown in FIG. 6, the optional mounting towers 7 can be joined to the down-scan transducer 9 by bolt or screw connection 20 to provide stability.

As shown in FIG. 2, the moveable mounting platform 3 can optionally have a removeable plate 11 which is connected to the main structure of platform 3 by member 22 which is attached by screws 24.

What is claimed:

1. A watercraft hull comprising:

a protective cavity in a bottom of the hull; and a moveable mounting platform adapted to carry data detection and collection devices releasably suspended from said protective cavity, said moveable mounting platform being coupled to elastic cords which allow said moveable mounting platform, when deployed, to move in any direction with respect to the watercraft hull in response to external impact or force.

2. The watercraft hull of claim 1 wherein said elastic cords are bungee cords.

3. A watercraft having a protective cavity in a bottom of a hull, a moveable mounting platform adapted to carry data detection and collection devices releasably suspended within said protective cavity, said moveable mounting platform being coupled to elastic cords which allow said moveable mounting platform, when deployed, to move on said elastic cords in any direction with respect to the hull in response to external impact or force.

4. The watercraft of claim 3 wherein said elastic cords are bungee cords.

5. The watercraft hull of claim 1 wherein said moveable mounting platform is controllable with angle adjustment by a spring system.

6. The watercraft hull of claim 1 wherein said moveable mounting platform is movable into the protective cavity actively and passively.

7. The watercraft hull of claim 1 wherein said moveable mounting platform has a kick up guard.

8. The watercraft hull of claim 1 wherein said moveable mounting platform is configured to accept a variety of mountable objects via removable plates and adjustable mounting towers.

9. A protective cavity in a bottom of a watercraft hull, a static rim affixed to a lower extremity of said cavity, a moveable mounting platform releasably suspended within said cavity above said rim and sized to be able to pass through said rim, spring supports adapted to cause said moveable mounting platform to move down to and project below said cavity when the movable mounting platform is not suspended to thereby deploy said moveable mounting platform while allowing said moveable mounting platform passively to move on said spring supports with respect to the hull in response to external impact or force.

10. The protective cavity of claim 9 wherein the spring supports are bungee cords.

11. The protective cavity of claim 9 wherein said moveable mounting platform is releasably suspended from said cavity by a retraction line or cord.

12. The protective cavity of claim 9 wherein said moveable mounting platform carries a down-scan transducer.

13. The protective cavity of claim 9 wherein said moveable mounting platform carries a side-scan transducer.

14. The protective cavity of claim 9 wherein said moveable mounting platform carries a camera.

15. A watercraft having a protective cavity in a bottom of a hull, a static rim affixed to a lower extremity of said cavity, a moveable mounting platform releasably suspended within said cavity above said rim and sized to be able to pass through said rim, spring supports adapted to cause said moveable mounting platform to move down to and project below said cavity when the movable mounting platform is not suspended to thereby deploy said moveable mounting platform while allowing said moveable mounting platform passively to move on said spring supports with respect to the hull in response to external impact or force.

16. The watercraft of claim 15 wherein said spring supports are bungee cords.

17. The watercraft of claim 15 wherein said moveable mounting platform is movable into the protective cavity actively and passively.

18. The watercraft of claim 15 wherein said moveable mounting platform has a kick up guard.

19. The watercraft of claim 15 wherein said moveable mounting platform is configured to accept a variety of mountable objects via removable plates and adjustable mounting towers.

20. The watercraft of claim 15 wherein said moveable mounting platform is releasably suspended from said cavity by a retraction line or cord.

21. The watercraft of claim 15 wherein said moveable mounting platform carries a down-scan transducer.

22. The watercraft of claim 15 wherein said moveable mounting platform carries a side-scan transducer.

23. The watercraft of claim 15 wherein said moveable mounting platform carries a camera.

* * * * *